US007996544B2

(12) United States Patent
Jakubik et al.

(10) Patent No.: US 7,996,544 B2
(45) Date of Patent: Aug. 9, 2011

(54) TECHNIQUE OF DETECTING DENIAL OF SERVICE ATTACKS

(75) Inventors: Patricia Ann Jakubik, Raleigh, NC (US); Patrick Michael LiVecchi, Raleigh, NC (US); Linwood Hugh Overby, Jr., Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 2797 days.

(21) Appl. No.: 10/615,438

(22) Filed: Jul. 8, 2003

(65) Prior Publication Data

US 2005/0010817 A1 Jan. 13, 2005

(51) Int. Cl.
*G06F 15/16* (2006.01)
(52) U.S. Cl. ........................................ 709/229
(58) Field of Classification Search ................ 709/229
See application file for complete search history.

(56) References Cited

U.S. PATENT DOCUMENTS

| 6,480,892 | B1* | 11/2002 | Levay et al. ............ 709/224 |
| 6,513,133 | B1 | 1/2003 | Campbell ............ 713/201 |
| 6,757,255 | B1* | 6/2004 | Aoki et al. ............ 370/252 |
| 6,847,613 | B2* | 1/2005 | Mimura et al. ............ 370/235 |
| 6,904,529 | B1* | 6/2005 | Swander ............ 726/14 |
| 7,194,538 | B1* | 3/2007 | Rabe et al. ............ 709/224 |
| 2002/0083331 | A1* | 6/2002 | Krumel ............ 713/200 |
| 2003/0037141 | A1* | 2/2003 | Milo et al. ............ 709/225 |
| 2003/0043740 | A1* | 3/2003 | March et al. ............ 370/229 |
| 2005/0125195 | A1* | 6/2005 | Brendel ............ 702/182 |

OTHER PUBLICATIONS

Farrow, R. "Network Defense", PC Magazine, Jul. 1999.
Allot Communications, "Protecting Networks From DOS Attacks and Malicious Traffic", http:\\www.allot.com/html/solutions_enterprise_dos_attacks.shtm, pp. 1-9.
Golomshtok, A. "Troubleshooting Solaris (Tm) Network Performance", System Adminnistration, v11 n 11 Nov. 2002.
Elnozahy, E. et al "Hop Integrity in Computer Networks", Research Disclosure N450, Article 150, p. 1794, Oct. 2001.
Capshaw, S. Minimizing the Effects of DOS Attacks, Juniper Networks, Inc., Nov. 2001.
Bruton, D. et al. "Intrusion Event Filtering and Generic Attack Signatures" IBM Patent Application, U.S. Appl. No. 10/058,689, filed Jan. 28, 2002.
Bruton, D. et al. "Integrated Intrusion Detection Services", IBM Patent Application, U.S. Appl. No. 10/058,870, filed Jan. 28, 2002.
Attwood, K. et al. "Technique of Defending Against Network Connection Flooding Attacks", IBM Patent Application, U.S. Appl. No. 09/502,478, filed Feb. 11, 2000.
West Coast Publishing, "Attack Mitigator", ISSN 1352-407, Secure Comput. (Int.Ed.) (UK) Aug. 2002, p. 244.

* cited by examiner

*Primary Examiner* — Kevin Bates
*Assistant Examiner* — John M Macilwinen
(74) *Attorney, Agent, or Firm* — Cuenot, Forsythe & Kim, LLC

(57) ABSTRACT

The invention detects a denial of service attack at a node by monitoring the number of discarded packets in relationship to the number of inbound packets. When an attack is detected, relevant inbound packet information is collected during the attack to help characterize the attack and at least to pinpoint the source of the last hop to the attacked node.

10 Claims, 2 Drawing Sheets

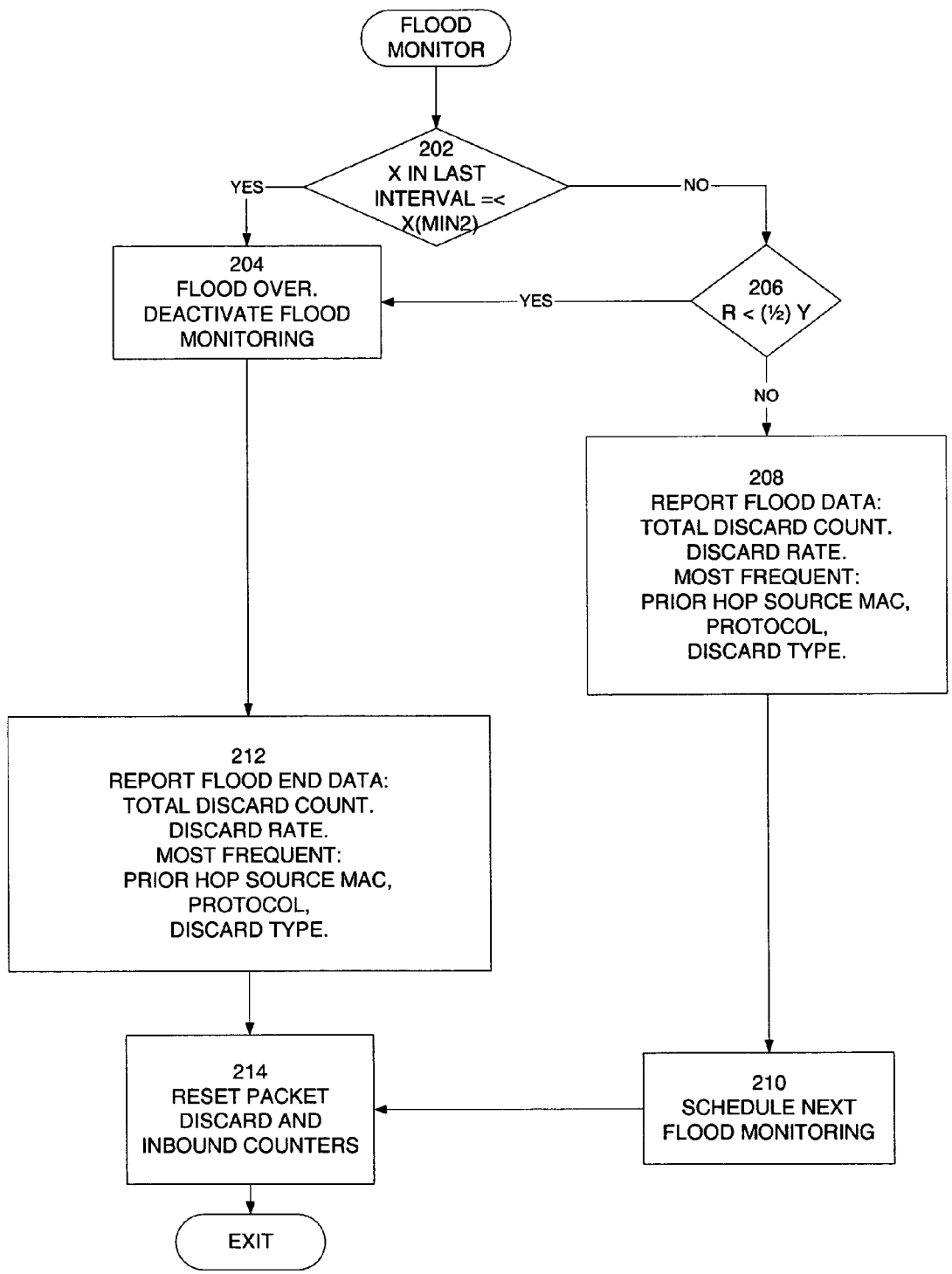

TECHNIQUE OF DETECTING DENIAL OF SERVICE ATTACKS

TECHNICAL FIELD

The invention relates generally to the field of networking and specifically to defending against attacks by malicious users attempting to disable a server by flooding the server with network traffic.

BACKGROUND OF THE INVENTION

Flooding attacks, commonly called Denial of Service attacks, have recently been used with increasing frequency to target and disable servers on the Internet. A flooding attack occurs when a user sends a large number of requests to a server in a relatively short period of time with an intent to overload and thereby disable the server. A flood of packets from a malicious user can overload a server in the same way that a flood of packets from a misconfigured system can overload a server. But the end result is the same; the server becomes overloaded in trying to service the requests. This prevents legitimate requests from being timely served and often causes the server to crash. A number of flooding attacks have been reported recently on web targets at the FBI, the Whitehouse, and the genealogy website of the Church of Latter Day Saints. Flooding attacks are very difficult for traditional intrusion detection systems to detect or prevent because of the difficulty of determining whether the traffic is legitimate or not. An increase in activity alone is not a good criterion for detecting a flood; the use of this criterion could lead to many false detections. Another negative associated with using inbound activity as a method of detecting a flood is the high overhead associated with this detection method because the detection processing must occur in the mainline packet processing path. The source of an attack is also difficult to determine because attackers will normally use a spoofed source IP address so that address gives no true indication of the source of the attack.

SUMMARY OF THE INVENTION

The invention recognizes that the consequences of intentional flooding attacks and nonintentional overload situations resulting from a burst of connection requests can be mitigated by dropping the traditional notion of attempting to distinguish between legitimate and illegitimate traffic. An increase in packet discards by a protocol stack is a good indicator of an attack. An attacker's intent is to use up system resources. This can be done by filling up queues, consuming storage or just burning CPU cycles. Most TCP stacks limit queue size and detect and discard overflow and malformed packets. The number of packet discards and the rate of discards are normally relatively low. The invention monitors the number and rate of packet discards and raises an event when a specified percentage of traffic received on a physical interface is being discarded. Protocol stacks already contain a number of packet checks, such as malformed packets, checksum failures, no application to receive a packet, queue level full, etc. Packets are discarded by each of these checks. In the preferred embodiment, a discard rate check is performed not on every discard, but after a specified number of discarded packets is received. This limits the amount of processing that is devoted in the main packet processing line to attack detection.

The preferred embodiment is also able in many cases to trace the source of a flood back at least to a prior hop.

The preferred embodiment requires that a minimum number of packet discards occur within a specified interval to trigger further detection. For example, a policy might specify an interval and require that 1000 packet discards occur within that interval before a further flood check is performed. This prevents situations of triggering a flood condition when a high rate of discards occurs in a small number of packets. If this minimum number of discards in an interval is met, then the rate of discards for that or a different interval is determined. If the rate exceeds a specified threshold, then a flood event is initiated. During a flood event, flood monitoring occurs. Flood monitoring attempts to detect, again using minimum discards and rate thresholds, when a flood has ended. During monitoring, flood data is collected at intervals and stored for future analysis. Such data includes Discard counts, discard rates, protocol types, discard types and prior hop Media Access Control (MAC) addresses associated with discarded packets.

BRIEF DESCRIPTION OF THE DRAWING

In the drawing,

FIG. 2 shows the illustrative operations performed by a flood monitoring process in response to the initiation of flood monitoring by the flowchart of FIG. 1.

DETAILED DESCRIPTION

Figure 1:
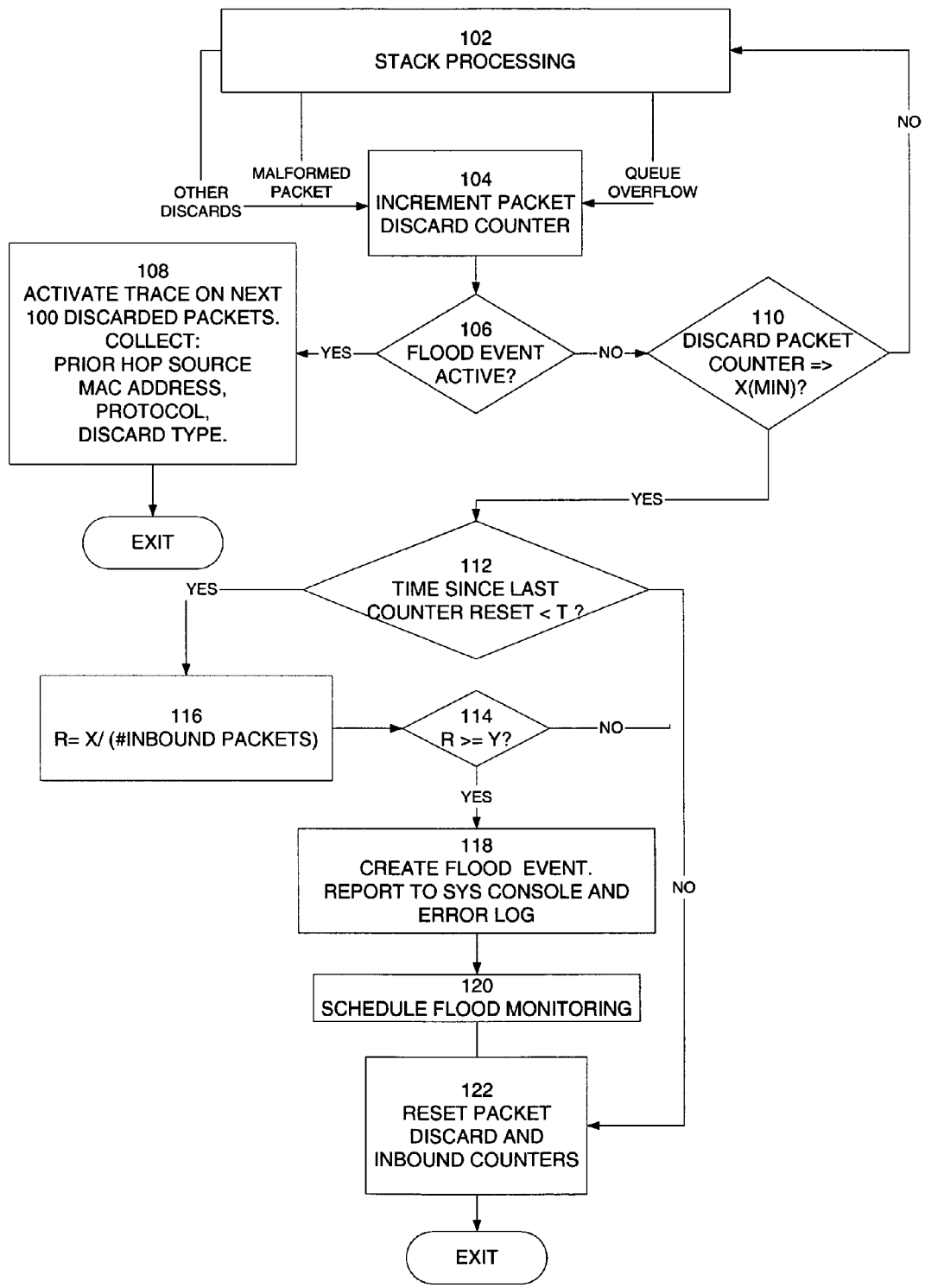
FIG. 1 shows an illustrative flowchart of operations executed at a server to detect a flood attack and trigger a flood monitoring operation.

The invention requires that a server using the invention be configured with certain parameters. By way of example, the preferred embodiment requires that a policy be specified that specifies the number of discarded packets that must be detected before detection of a flood event will be performed. Further, a minimum number of discarded packets and the relevant discard rate are also specified to declare a flood event. Once a flood event has been declared, the policy specifies how often a flood monitor process will be executed and other parameters relating to the monitoring.

In FIG. 1, step 102 represents the normal protocol stack processing operations. There are a number of checks performed by the stack for packets that should be discarded. Illustrated are malformed packets, input queue overflow and a catch-all called other discards. When any such packet discard is performed by the stack, entry is made to step 104 where a packet discard counter is incremented. Step 106 next determines if a flood event (a monitoring operation initiated earlier) is already in progress. If the answer is no, step 110 checks the packet discard counter to determine if the number of discards have exceeded a minimum threshold value X (taken from system policy in the preferred embodiment). If not, flood detection is not performed on this discard and processing is returned to stack operations at 102. If the minimum number of discards X(MIN) is exceeded, then step 112 determines if this number of discards occurred within an interval T. T is also specified by policy in the preferred embodiment. If the answer to step 112 is no, then no flood attack is deemed to exist. In this case, step 122 resets the packet discard counter and an inbound packet counter and exits.

At step 106, if a flood event is already in progress, then step 108 collects and stores a set of information for analysis. By way of example, such information might be the prior hop address (the MAC address of the adapter at the preceding node, the protocol used for the last discarded packet, the reason for the discard, etc....). In addition, step 108 initiates a trace of succeeding packets. In the preferred, packet information pertaining to the next one hundred packets is stored for later analysis.

Returning to step 112, if the minimum number of discards have occurred in less than the interval T, then a flood attack might be occurring. To determine this, step 116 calculates the rate R of discards by dividing the number of discards X by the number of incoming packets received in the interval. At step 114, if the rate R does not exceed a threshold Y (also set by policy in the preferred embodiment), then no attack is in progress and the program resets the counters at step 122 and exits. On the other hand, an attack is deemed to be in progress if the threshold Y is exceeded at step 114. In this event, step 118 initiates a flood event by setting an appropriate marker and sends a report to the system console and error log. Step 120 schedules the execution of the flood monitor process of FIG. 2. Step 122 resets the packet discard and inbound packet counters and the program exits. Once a flood event has been declared, a policy specifies how often a flood monitor process will be executed and other parameters relating to the monitoring. The preferred embodiment uses a one minute interval for monitoring, but this could also be specified by policy.

Once a flood event is activated by step 118, the Flood Monitor of FIG. 2 is entered later at a scheduled time. In the preferred embodiment, this interval is set at one minute. Step 202 first determines if the packet discard count in the last interval (one minute in the preferred embodiment) is less than or equal to a minimum number of discards X(MIN2). In the preferred embodiment, X(MIN) equals X(MIN2); however, this is not a requirement and these two specified thresholds might differ in other embodiments. If the discards at step 202 is less than X(MIN2), then the flood attack is deemed to be over. Step 204 deactivates the flood event by resetting the flood marker. Step 212 analyzes and reports on the set of data collected in step 108. This set is preferably the last discount count, the discard rate, and the most frequent discard MAC address, protocol type and discard type. The counters are reset at 214 and the flood monitoring process is over.

Returning to step 202, If X(MIN2) is exceeded, then step 206 determines if the rate of discards R in the last monitoring interval is less than one-half of the specified Threshold Y. If the answer is yes, then this is also used to indicate that the flooding attack is over. If the answer at 206 is no however, the attack is deemed still to be in progress. Step 208 analyzes and reports on the same data as reported in step 212. However, reporting here is done at intervals while the flood event is active. Step 210 schedules the next flooding monitoring event so that the Flood Monitor of FIG. 2 will be executed once again at the expiration of the monitoring interval. Again, step 214 resets the counters and exits. Eventually the flood will be deemed over either at step 202 or 206 and a final set of data analyzed and reported at step 212.

The invention is able to determine, in some cases, the most likely prior hop that is in the source of attack. Once an interface flood event is raised, information about each discard received on the interface is collected. This data includes the prior hop source MAC address (if the interface type provides this information). At intervals during the flood event and when the flood event ends, information about the flood characteristics is reported. This data includes the prior hop source MAC address reported most frequently for the flood event discards.

Artisans in the field of this invention will quickly realize that the preferred and disclosed embodiment can have many minor variations that are within the intent and scope of the teaching. It is the intent of the inventor to encompass these variations to the extent possible in accordance with the state of the applicable relevant art in the field of the invention.

We claim:

1. A method of detecting a denial of service attack at a network server, comprising:
    counting a number of inbound packets and a number of discarded packets in a specified interval,
    responsive to the number of discarded packets in the specified interval exceeding a specified minimum, calculating a percentage of discarded packets, wherein the percentage of discarded packets is the number of discarded packets divided by the number of inbound packets, and
    responsive to the percentage of discarded packets exceeding a specified threshold, setting a denial of service event marker.

2. The method of claim 1, further comprising:
    collecting inbound packet information to further characterize the denial of service attack.

3. The method of claim 2, wherein collecting the inbound packet information further comprises:
    initiating a flood monitoring process that is executed at designated intervals to collect the inbound packet information while the denial of service attack is in progress.

4. The method of claim 3, wherein the flood monitoring process comprises:
    resetting the denial of service event marker if the number of discarded packets in the specified interval before execution of the flood monitoring process is lower than a second specified minimum.

5. The method of claim 4, further comprising:
    collecting the inbound packet information to further characterize the denial of service attack when the denial of service attack is declared over.

6. The method of claim 5, wherein the inbound packet information includes at least one of:
    a) a number of inbound packets in a last interval;
    b) a number of discarded packets in a last interval;
    c) a packet discard rate;
    d) a most frequent discard protocol type;
    e) a most frequent discard type; and
    f) a media access control address of an immediately prior packet hop.

7. The method of claim 3, wherein the flood monitoring process comprises:
    resetting the denial of service event marker if a rate of discarded packets in the specified interval before execution of the flood monitoring process is less than a second specified threshold.

8. The method of claim 7, further comprising:
    collecting additional inbound packet information to further characterize the denial of service attack when the denial of service attack is declared over.

9. The method of claim 3, wherein the flood monitoring process comprises:
    determining if the denial of service attack is still in progress by comparing packets discarded in a last interval with the number of inbound packets, and
    maintaining the flood monitoring process if the denial of service attack is still in progress.

10. The method of claim 9, further comprising:
    collecting inbound packet information for the last interval.

* * * * *